Nov. 24, 1936.　　　E. D. LILJA　　　2,062,135

CONTROL FOR ELECTRIC CIRCUITS

Filed Jan. 11, 1935

INVENTOR
Edgar D. Lilja
BY
Parker, Carlson, Pitzner & Hubbard
ATTORNEYS

Patented Nov. 24, 1936

2,062,135

UNITED STATES PATENT OFFICE 2,062,135

CONTROL FOR ELECTRIC CIRCUITS

Edgar D. Lilja, Rockford, Ill., assignor to Howard D. Colman, Rockford, Ill.

Application January 11, 1935, Serial No. 1,289

9 Claims. (Cl. 172—239)

This invention relates generally to the control of one electric circuit in accordance with current or voltage fluctuations in another or controlling circuit, and has more particular reference to a control in which a circuit of an alternating current machine constitutes the controlling circuit.

One object is to provide a novel means for controlling a power transmitting mechanism such as an electromagnetic friction clutch in accordance with current fluctuations in the circuit of a motor driving the mechanism so as to limit the maximum load to which the motor is subjected and enable the load on the motor to be accelerated smoothly.

Figure 1:
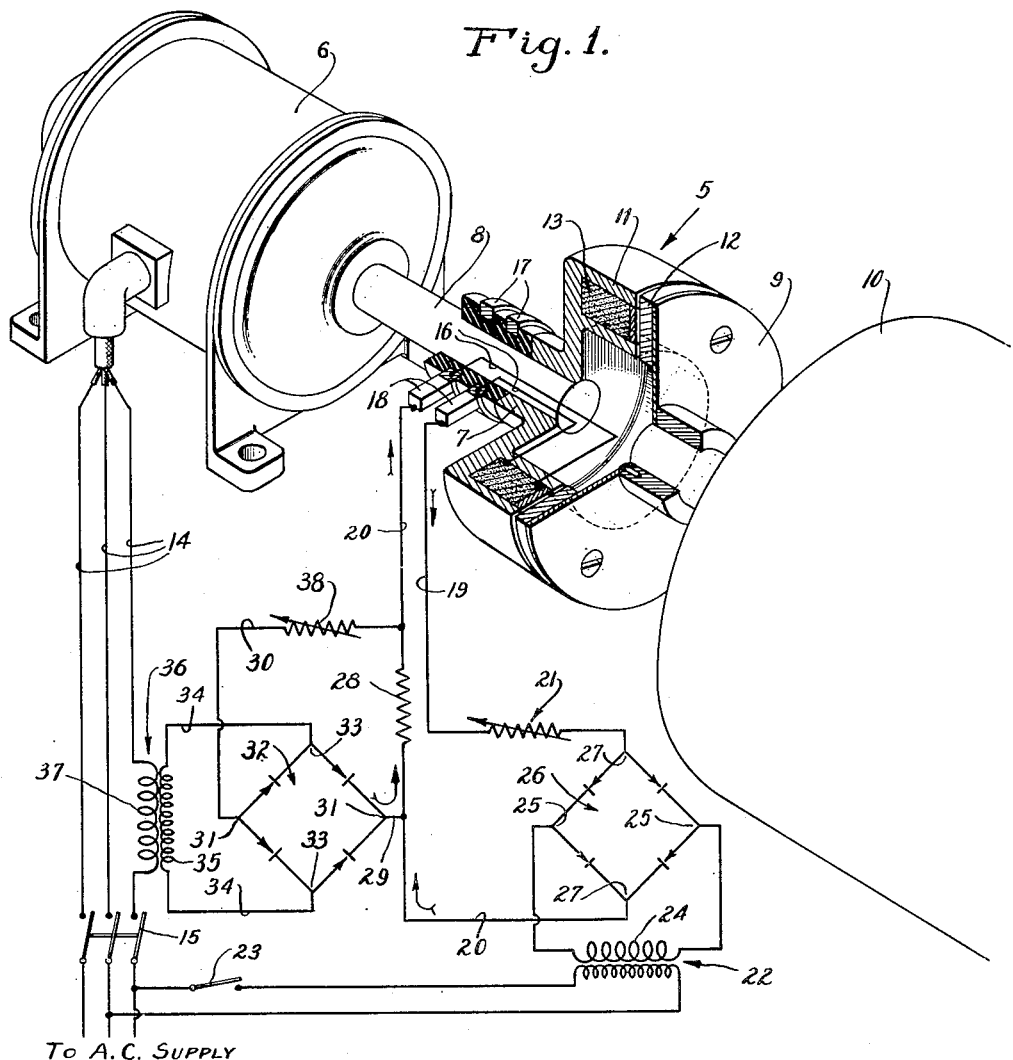

Other objects and advantages of the invention will become apparent from the following detailed description taken in connection with the accompanying drawing, in which Figure 1 is a schematic view and wiring diagram of a circuit control mechanism embodying the features of the present invention.

Figure 2:
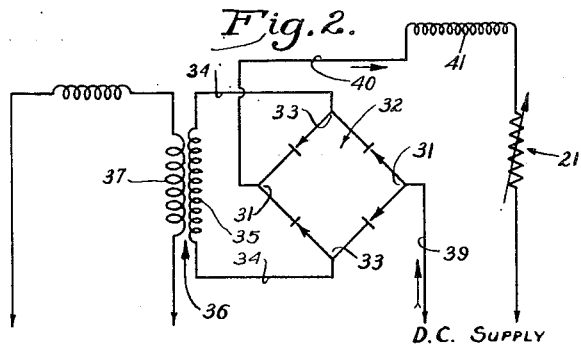

Fig. 2 is a wiring diagram illustrating another form of the control.

For purposes of illustration, the control contemplated by the invention is shown in Fig. 1 of the drawing for regulating the operation of a power transmitting mechanism 5 so as to limit the load to which motor 6 may be subjected. While the invention is especially applicable to this use, I do not intend to limit the invention by such exemplary disclosure but aim to cover all alternative forms and uses falling within the spirit and scope of the invention as expressed in the appended claims.

In the form shown, the power transmitting mechanism 5 comprises an electromagnetically controlled friction clutch of the so-called direct acting type having a driving member 7 fast on the shaft 8 of the motor 6 and a driven member 9 connected to a load represented at 10. Mounted on said members is an annular magnet core 11 and a mating armature 12 which are drawn into axial gripping engagement upon energization of a winding 13 carried by the core. With a clutch of this character, the degree of frictional gripping engagement and therefore the torque which may be transmitted without slippage is dependent on the degree of energization of the winding 13.

One of the circuits from which the motor 6 is excited constitutes the controlling circuit above referred to, while the direct current circuit for energizing the clutch winding 13 is the controlled circuit in the present instance. In the present instance, a three phase alternating current motor is illustrated having field circuits which include three conductors 14 extending from the source of alternating current to the field windings to which current will be applied when a control switch 15 is closed.

The clutch circuit includes conductors 16 connecting the terminals of the winding 13 with slip rings 17 engaged by brushes 18 which are joined by conductors 19 and 20 to a source of direct current the magnitude of which may be varied by adjustment of a variable resistance 21 interposed in the conductor 19. If desired, the alternating current source from which the motor is energized may also be used as the source of direct current potential. To this end, the primary winding of a transformer 22 is arranged to be energized from the alternating current source whenever a control switch 23 is closed. The secondary winding 24 is connected to the alternating current terminals 25 of a full wave rectifier 26 of the dry plate type having its output or direct current terminals 27 connected to the conductors 19 and 20. Thus, whenever the switch 23 is closed, direct current will flow through the clutch winding 13 in the direction indicated by the arrows, and the magnitude of the current will be determined by the setting of the rheostat 21.

It is well understood that the current drawn by an electric motor of the above character increases and decreases with the load on the motor, and that under sufficient overloading, the motor may be damaged. Excessive overloading, particularly during starting, is ordinarily avoided by the use of a motor of substantially greater capacity than is required for handling the load after normal operating speed has been attained.

The invention in the form shown in Fig. 1 aims to prevent overloading of the motor through the use of a control which operates automatically in response to variations in the load as determined by fluctuations in the motor current to regulate the degree of energization of the clutch 5 so as to cause slippage of the latter when the load on the motor increases above a safe maximum limit. This is accomplished by impressing upon the clutch circuit a direct current potential acting in opposition to the normal current flow therein and automatically varied in magnitude as the current varies and in the same direction so as to cause the current energizing the clutch to be increased as the motor current decreases and vice versa. To this end, a resistance element 28 is interposed in the conductor 20 and its opposite terminals are connected by conductors 29 and 30 to the output terminals 31 of a full wave rectifier 32.

To vary the input to the rectifier 32 in accordance with fluctuations of the motor current, the input terminals 33 of the rectifier are connected by conductors 34 to the secondary winding 35 of a transformer 36 having a primary winding 37 interposed in one of the conductors 14 and therefore in series with the motor field winding. It will be observed that as the load on the motor and therefore the field current increases, the voltage drop across the transformer primary 37 will increase. As a result of the increased secondary voltage impressed upon the rectifier 32, more current will flow in the local circuit defined by the conductor 29, the resistance element 28, the rheostat 38, the conductor 30 and the rectifier 32.

The rectifier 32 is so connected as to send current through the resistance 28 in the same direction as the current flow produced by the rectifier 26. Since an increase in the current delivered by the rectifier 32 increases the voltage drop through the resistance 28, the net voltage available across the terminals of the clutch winding 13 will be reduced by an amount corresponding to the increase in the rectifier output. As a result, an increase in the motor current will result in a decrease in the clutch current, and a decrease in the motor current will increase the clutch current.

The rate of change of the clutch current with respect to the motor current may be adjusted simply and conveniently by providing a rheostat 38 in the local circuit. By adjustment of this rheostat and manipulation of the rheostat 21 to produce the desired average current flow in the controlling circuit, the control may be conditioned for producing within wide limits any desired relation between the controlling motor current and the controlled clutch current. For the application shown, the adjustment is such that after the load has been brought up to normal operating speed, the current energizing the clutch will normally exceed the value required to prevent slippage between the clutch elements. In other words, fluctuations in the motor current during normal operation will not cause the clutch to slip. But when an abnormal load is encountered, such for example as during starting of the motor under load, the resulting increase in the motor current will be sufficient to reduce the clutch current in the manner above described to a value which will result in proper slippage between the coacting clutch elements. The motor is thus relieved of undesired overload and the motor current limited to a definite maximum value. Through the use of such a control, the size of the motor selected for a given installation may correspond more nearly to the load requirements at normal operating speeds.

The control above described possesses numerous advantages among which is the complete elimination of moving parts such as would be incorporated in a relay or magnetically operated rheostat used for this purpose. The use of switches or other parts subject to wear and deterioration in service is avoided. Since all of the automatic functions are performed entirely by electrical means, there is practically no current or time lag in the response of the controlled circuit to changes in the controlling circuit. When the control is used for governing the operation of a motor clutch, a smooth and constant acceleration of the load is attained during starting in spite of variations in the supply voltage of the clutch circuit and in the coefficient of friction between the engaging clutch surfaces.

It will be observed that regulation of the clutch current is effected by energizing the local circuit from the controlling circuit and utilizing this circuit to force additional variable current through a portion of the controlled circuit so as to vary the net voltage available for energizing the controlled winding 13. The magnitude of this superimposed current is a function of the controlling current and more or less independent of the phase relation existing between this current and the voltage which energizes the rectifier 26. By virtue of this arrangement, the control is substantially insensitive to differences in the phase relation between the controlling current and the voltage across the alternating current terminals of the controlled circuit supply. This is particularly desirable where the control is used in connection with polyphase machinery. All of the parts of the control are of simple and inexpensive construction and may be assembled readily to form a compact unit which may be installed and adjusted in service without the aid of skilled technicians.

Through the use of the resistance element 28, it is possible to impose the controlling countervoltage upon the controlled circuit by the use of the simple rectifier 32 and thereby vary the current in the controlling and controlled circuits in inverse relation in spite of the fact that the rectifier will not pass current in the reverse direction.

For applications where the current in the controlled circuit is to vary in the same direction as the current or voltage fluctuations in the controlling circuit, the rectifier 32 may be interposed directly in the controlled circuit as shown in Fig. 2, the resistance 28 and the rheostat 38 being dispensed with providing that no adjustment of the control is required. To this end, the output terminals 31 of the rectifier are connected by conductors 39 and 40 to the direct current source and the winding 41 in the controlled circuit respectively, the rectifier being arranged to pass current in the proper direction as indicated by the arrows. In this arrangement, the control circuit is in effect energized from two separate sources one of which has a fixed voltage and the other of which has a voltage which varies in accordance with current or voltage fluctuations in the controlling circuit.

I claim as my invention:
1. The combination of a mechanical power transmission mechanism having driving and driven members and an electric energizing winding, an alternating current motor coupled to the driving member of said mechanism, means providing a source of alternating current, a transformer having a primary energized by said source, a rectifier having its input terminals connected to the secondary winding of said transformer, a conductor extending from one output terminal of said rectifier to one terminal of the winding of said mechanism, a conductor extending from the other output terminal of the rectifier to the other terminal of the winding of said mechanism and including a resistance element, a second rectifier having output terminals respectively connected to the terminals of said element, a second transformer having its secondary winding connected to the input terminals of said second rectifier, and a circuit for energizing the motor from an alternating current source including the primary of said second transformer.

2. The combination of an alternating current motor having an energizing circuit, a mechanical power transmission mechanism having driving and driven members and an electric energizing winding, said driving member being driven by said motor, means providing a source of direct current, a circuit through said source and the winding of said mechanism including a resistance element, a transformer having a primary winding energized from said motor circuit, and a rectifier having its input terminals connected to the secondary winding of said transformer and its output terminals respectively connected to the terminals of said resistance element.

3. The combination of an alternating current motor having an energizing circuit, a mechanical power transmission mechanism having driving and driven members and an electric energizing winding, said driving member being driven by said motor, means providing a source of direct current, a circuit through said source and the winding of said mechanism including a resistance element, a transformer having a primary winding energized from said motor circuit, a rectifier having its input terminals connected to the secondary winding of said transformer and its output terminals respectively connected to the terminals of said resistance element, and a variable resistance in the output circuit of said rectifier operable to adjust the rate of change of the current in said winding with respect to the motor current.

4. The combination of a mechanical power transmission mechanism having an energizing winding, driving and driven power transmission elements adapted for engagement when said winding is energized, an electric motor arranged to drive said driving element, a circuit by which said motor may be excited, an energizing circuit including said energizing winding and a resistance element in series therewith, an auxiliary constantly closed circuit in parallel with said resistance element, and means operating in response to current fluctuations in the motor circuit to decrease and increase the voltage developed in said auxiliary circuit.

5. The combination of a mechanical power transmission mechanism having an energizing winding and driving and driven power transmission elements adapted for engagement when said winding is energized, an electric motor arranged to drive said driving element, circuits for energizing said motor and said energizing winding, and all electric means responsive to current fluctuations in said motor circuit to vary the current in the energizing winding circuit automatically and limit the maximum load to which said motor may be subjected during starting, all of the parts of said means being stationary.

6. The combination of a mechanical power transmission mechanism having an energizing winding and driving and driven power transmission elements adapted for engagement when said winding is energized, an electric motor arranged to drive said driving element, an alternating current circuit for energizing said motor, a circuit for energizing said energizing winding, and all electric means including a rectifier having its output connected in the energizing winding circuit and its input connected to a current transformer in said alternating current supply circuit and responsive to current fluctuations therein to vary the current in the energizing winding circuit automatically and limit the maximum load to which said motor may be subjected during starting, all of the parts of said means being stationary.

7. The combination of a mechanical power transmission mechanism having an energizing winding and driving and driven power transmission elements adapted for engagement when said winding is energized, an electric motor arranged to drive said driving element, circuits for energizing said motor and said energizing winding, and all electric means responsive to current fluctuations in said motor circuit for imposing a voltage on the energizing winding circuit which is the differential between a substantially constant voltage and a voltage fluctuating in accordance with the current fluctuations in said motor circuit to vary the current in the energizing winding circuit automatically and limit the maximum load to which said motor may be subjected during starting, all of the parts of said means being stationary.

8. The combination of a mechanical power transmission mechanism having an energizing winding, driving and driven power transmission elements adapted for engagement when said winding is energized, an electric motor arranged to drive said driving element, a circuit by which said motor may be excited, an energizing circuit for said energizing winding, a resistance element, an auxiliary constantly closed circuit in parallel with said resistance element, means operating in response to current fluctuations in the motor circuit to decrease and increase the voltage developed in said auxiliary circuit, and means utilizing the variations in voltage across said resistance impressed thereon by said last named means to vary the voltage imposed on said energizing circuit.

9. The combination of a mechanical power transmission mechanism having an energizing winding, driving and driven power transmission elements adapted for engagement when said winding is energized, an electric motor arranged to drive said driving element, a circuit by which said motor may be excited, an energizing circuit for said energizing winding, a resistance element, an auxiliary constantly closed circuit in parallel with said resistance element, means including a current transformer operating in response to current fluctuations in the motor circuit to decrease and increase the voltage developed in said auxiliary circuit, and means for imposing a variable voltage on said energizing circuit which is the differential between a substantially constant voltage and the variable voltage impressed on said resistance by said current transformer.

EDGAR D. LILJA.